United States Patent [19]

Hudson

[11] Patent Number: 4,867,009
[45] Date of Patent: Sep. 19, 1989

[54] POSITIVE TRACTION DIFFERENTIAL UNIT

[76] Inventor: John L. Hudson, Rte. 1, Florence, S.C. 29501

[21] Appl. No.: 180,372

[22] Filed: Apr. 12, 1988

[51] Int. Cl.[4] .............................................. F16H 35/04
[52] U.S. Cl. ........................................ 74/650; 192/50
[58] Field of Search ................... 74/650, 216.3; 192/50

[56] References Cited

U.S. PATENT DOCUMENTS

| 993,563 | 5/1911 | Stanley | 192/50 |
|---|---|---|---|
| 997,585 | 7/1911 | Stanley | 192/50 |
| 1,162,754 | 12/1915 | Deegan | 74/650 |
| 1,232,244 | 7/1917 | Dick | 192/50 |
| 1,238,659 | 8/1917 | Ford | 74/650 |
| 1,282,614 | 10/1918 | Miller | 74/650 |
| 1,313,247 | 8/1919 | Bailey | 74/650 |
| 1,692,531 | 11/1928 | Abramson | 74/650 |
| 1,823,092 | 9/1931 | De Lavaud | 74/650 |
| 1,946,358 | 2/1934 | Porsche et al. | 74/650 |
| 2,139,405 | 12/1938 | Frederickson | 74/650 |
| 2,150,312 | 3/1939 | Barnes | 74/650 |
| 2,338,215 | 1/1944 | Summy | 74/650 |
| 2,651,214 | 7/1950 | Randall | 74/650 |
| 2,729,118 | 1/1956 | Emslie | 74/650 |
| 2,841,036 | 7/1958 | Decker | 74/650 |
| 2,938,407 | 5/1960 | Nallinger et al. | 74/650 |
| 2,967,438 | 1/1961 | Altmann | 74/650 |
| 3,130,604 | 4/1964 | Johnson et al. | 74/650 |

FOREIGN PATENT DOCUMENTS

| 0391583 | 10/1924 | Fed. Rep. of Germany | 74/650 |
|---|---|---|---|
| 0853884 | 6/1940 | France | 74/650 |

Primary Examiner—Dwight G. Diehl
Assistant Examiner—Harold F. Macris
Attorney, Agent, or Firm—Dority & Manning

[57] ABSTRACT

A differential drive unit receives a rotational input and provides two rotational outputs therefrom. A rotatable housing has fixedly attached therein a drive member, which includes a drive plate transverse angled slots extending from one side thereof to the other. A plurality of movable drive balls are provided in the slots. Disposed within the housing on either side of the drive plate are driven members having semi-spherical drive member-receivers formed therein. Upon rotation of the housing and its drive plate, the drive balls are thrown outwardly in the angled slots and come into contact with available drive ball receivers adjacent thereto. Such contact transfers the rotational drive force from the drive plate to the driven members. Driven members are in turn connected to respective driven shafts with wheels thereon. One wheel can on occasion be caused to be turned faster than the other, such as during a turn. Such occurrence causes its corresponding driven member to move relative to the drive plate. The drive ball associated with that driven member is hence forced out of its drive ball receiver to eventually relocate in another "downstream" drive ball receiver on that same driven member, thereby again locking that driven member to the drive plate for rotation therewith. Upon reverse rotation of the drive plate, the drive balls are directed through the angled slots to engage with a drive ball receiver on the opposite driven member.

20 Claims, 6 Drawing Sheets

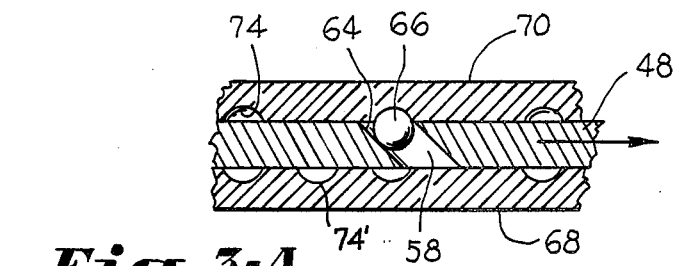
Fig. 3-A.
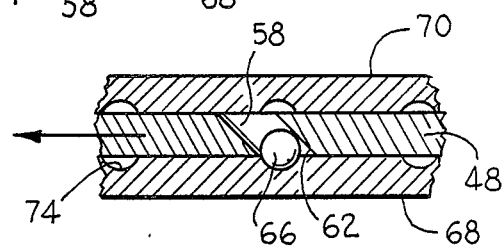
Fig. 3-B.
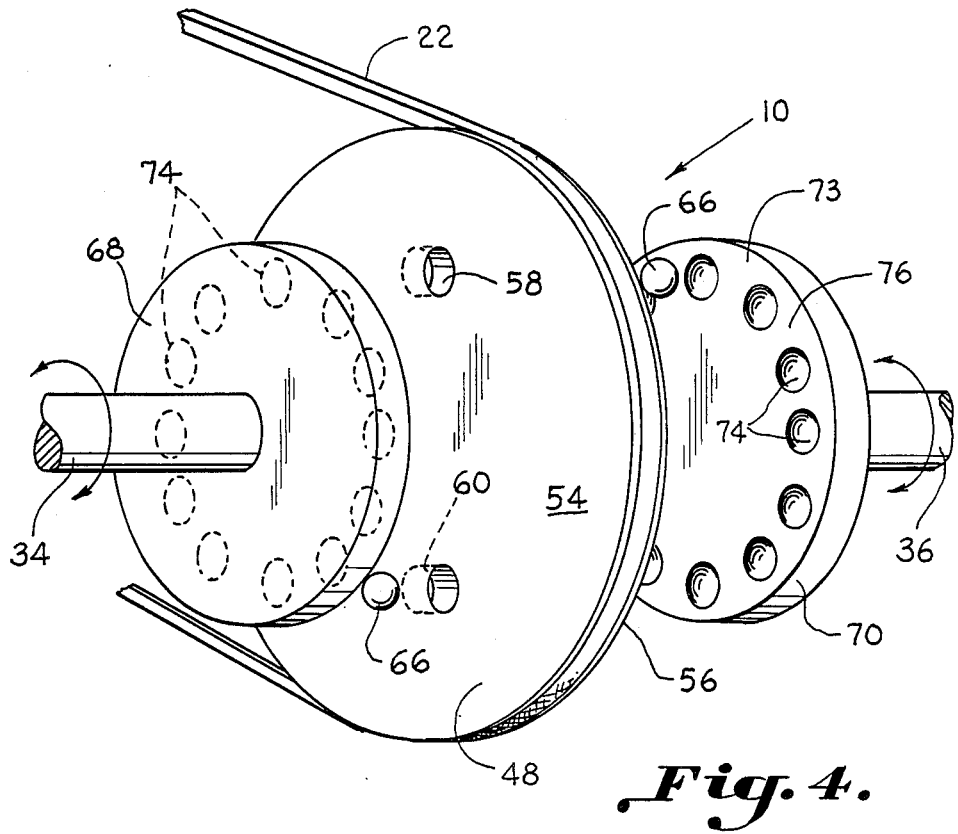
Fig. 4.

POSITIVE TRACTION DIFFERENTIAL UNIT

BACKGROUND OF THE INVENTION

The present invention generally concerns an improved differential drive, and more particularly relates to a positive traction differential unit using drive balls for differentially transferring rotational forces from a central member to drivable shafts on either side of the central member.

Differential transmission units, generally for allowing a common rotational input to be differentially transferred between two axle shafts, have long been in existence. For example, in one type of differential transmission unit such as sometimes used in a rear wheel drive automobile, when either of the rear driving wheels begin to slip due to loss of traction, driving input from the automobile drive shaft is diverted to that wheel, and the power to effectively move the vehicle is thus in proportion to the traction of the slipping wheel.

In some cases, power delivered from the drive shaft to the non-spinning wheel is insufficient to move the vehicle, because substantially all of the driving power is being diverted to the slipping wheel. In such an event, the vehicle may become immobilized due to the lack of traction of the spinning wheel (even though the non-slipping wheel may have sufficient traction). Because substantially all of the driving power from the drive shaft is transferred to the slipping wheel by the differential unit, the non-slipping wheel never receives sufficient rotational input for mobilizing the vehicle.

Other types of differential transmission units may be locked manually or automatically for transmitting rotational drive power from a drive shaft to a pair of drive axles so that wheels mounted thereon deliver driving torque to a road surface, even if one of the wheels tends to slip or spin. Such differential transmission units are commonly referred to as limited slip or positive traction differential units. Unit locking may be variously accomplished. For example, U.S. Pat. No. 2,967,438, granted to Altmann, and U.S. Pat. No. 2,938,407, granted to Nallinger et al., each prevent a slipping wheel from receiving all of the driving input from a driving shaft, by diverting some power from the driving shaft to the axle connected to the other (non-slipping) wheel. The Altmann and Nallinger units have balls which selectively engage different members during operation.

Other known differential transmission units use movable balls, such as disclosed in U.S. Pat. Nos. 3,130,604 (Johnson et al.); 2,841,036 (Decker); 1,823,092 (granted to De Lavaud); 1,282,614 (Miller); and 1,238,659 (Ford).

U.S. Pat. No. 1,162,754, granted to Deegan, discloses another exemplary differential unit, and uses sliding members ("dogs") disposed within a driving ring which engage and drive follower plates carried adjacent the driving ring. The follower plates are in turn each connected to respective drive shafts for rotation therewith.

SUMMARY OF THE INVENTION

The present invention recognizes and addresses various drawbacks of prior art differential drive units. Thus, it is one general object of the present invention to provide an improved differential drive. One more particular object is to provide a positive traction differential unit for receiving a rotational input and delivering two rotational outputs therefrom.

Another present object is to provide such an improved differential unit which receives a rotational input and delivers two rotational outputs therefrom, without use of internal gears.

Another object of the present invention is to provide an improved differential unit which is of simple design and operation, but which may be used in a wide variety of applications.

Another object of the present invention is to provide an improved differential which may be used with a four wheel drive all-terrain vehicle. In such case, both the front and rear axles could utilize the differential unit to achieve improved differential traction.

Still another object of the present invention is to provide a differential unit which provides drive wheels of a vehicle with positive traction, whether the vehicle is moving forward or in reverse.

Various combinations of presently disclosed features and aspects of this invention may be provided so as to form given embodiments thereof. Generally, one such exemplary embodiment of the present invention includes a differential drive comprising: a rotatable drive plate adapted for receiving drive input, such plate including at least a pair of angled slots therein interconnecting opposing planar faces of the plate, the slots being at mutually opposing angles and each respectively receiving a drive ball therein; first and second drive shafts rotatably supported on respective, opposite sides of the drive plate; first and second drive coupling members, supported on the first and second drive shafts, respectively, and each having a planar coupling face situated parallel to and in close proximity with planar faces of the drive plate; and at least one drive ball receiving recess defined in the coupling face of each of the drive coupling members; wherein rotation of the drive plate directs such balls outwardly in their angled slots into contact with the drive coupling members, with the drive balls engaging certain of the receiving recesses and thereby transmitting drive power to their corresponding drive coupling members and drive shafts, selection of which recesses depending on differential speed rotation of said drive shafts.

Yet another present exemplary embodiment is directed to a differential drive for differentially translating power from a rotational input to two rotational outputs, said drive comprising: central drive member means for receiving rotational power, said central drive means including a drive plate having a first side and a second side disposed opposite from said first side, with a plurality of transverse angled slots extending therethrough between the first and second side of the drive plate, the transverse angled slots including a first slot of a first angle with respect to the first side of the drive member and a second slot of a second, opposite angle with respect to the first side of the drive plate; a plurality of drive balls carried in the first and second angled slots of the drive plate, the drive balls being outwardly projected in the angled slots upon rotation of the drive plate; a first driven member disposed adjacent the first side of the drive plate and mounted for rotation; and a second driven member disposed adjacent the second side of the drive plate and mounted for rotation; wherein each of the first and second driven members define a plurality of drive ball receivers for receiving the drive balls as the drive balls are projected outwardly, whereby upon rotation of the drive plate the drive balls are thrown outwardly in the first and second slots for engaging drive ball receivers of the first and second driven members, respectively, for causing rotational drive force from said central drive member means to be transferred differentially to said first and second driven members.

Still another exemplary construction in accordance with this invention concerns a differential drive apparatus for receiving a rotational input and for providing two rotational outputs, the differential drive apparatus comprising: a rotatable drive member having a first side and an oppositely disposed second side, and a plurality of transverse angled slots extending therethrough between said first and second sides, the transverse angled slots including a first slot of a first angle with respect to the first side of the drive member and a second slot of a second angle with respect to the first side of the drive member; drive means associated with the drive member for receiving rotational input, and thereupon rotating the drive member; a plurality of drive balls movably carried in said transverse angled slots, the drive balls during rotation of the drive member being outwardly projectable from the first and second sides of the drive member while being carried in the first and second slots; a first driven member disposed about the first side of the drive member, and a second driven member disposed about the second side of the drive member; and a first selector member disposed between the first driven member and the first side of the drive member, and a second selector member disposed between the second driven member and the second side of the drive member; the first and second selector members each defining at least one passage for receiving one of the drive balls projectable outwardly from the drive member; the first and second selector members including means for allowing only a predetermined number of drive balls to project outwardly at a time from each of the first and second sides of the drive member into engagement with the driven members; wherein the first and second driven members each define a plurality of drive ball receivers for receiving the drive balls when the balls project outwardly from the first and second slots of the drive member and through the passages of the first and second selector members, whereby upon rotation of the drive member, the drive balls are thrown outwardly and the first and second slots such that the predetermined number of drive balls project outwardly therefrom through the first and second selector members for differentially engaging the first and second driven members respectively, where drive member slot and selector passage alignment is such that the drive balls are received by the drive ball receivers, thereby causing the rotational forces of the drive member to be differentially transferred to the first and second driven members.

The foregoing objects and others will be more fully explained below in conjunction with descriptions of various exemplary embodiments. Those of ordinary skill in the art will appreciate various modifications and variations to such embodiments, such as the substitution of equivalent features and means, and the reversal of various members, which may be practiced without departing from the spirit and scope of this invention.

BRIEF DESCRIPTION OF THE DRAWINGS

A full and enabling disclosure of the present invention directed to those of ordinary skill in the art, including the best mode of the present invention, follows hereinafter together with reference to the accompanying drawings, in which:

FIGS. 3A and 3B are sectional views taken along the line 3—3 of FIG. 2, illustrating a center disk of a differential unit constructed in accordance with the present invention being driven in alternate directions;

FIG. 4 is an enlarged perspective, exploded view of an exemplary differential unit constructed in accordance with the present invention;

Figure 1:
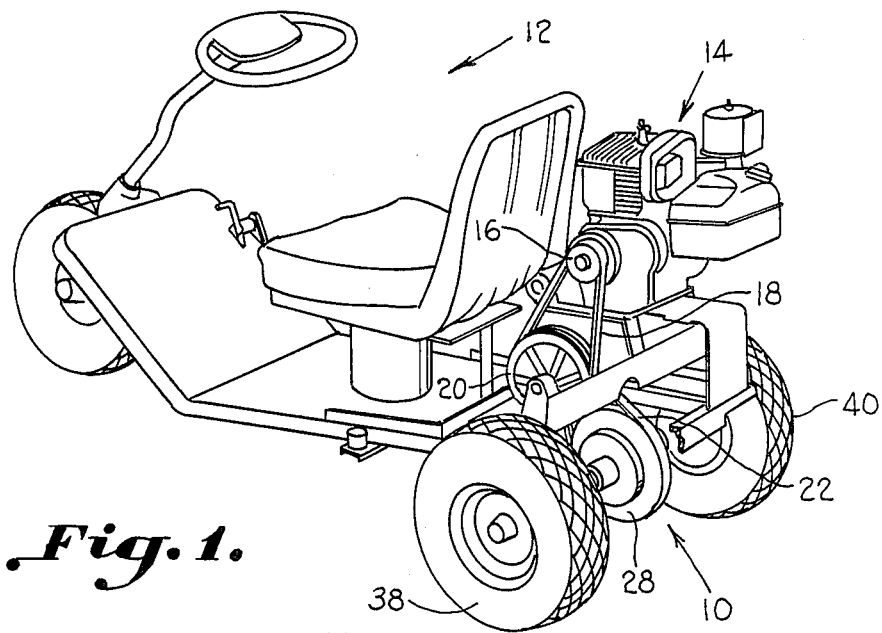
FIG. 1 is a perspective view of a vehicle having an exemplary differential unit constructed in accordance with the present invention provided thereon.

Repeat use of reference characters in this specification and the accompanying drawings is intended to represent same or analogous features or aspects of the present invention.

DESCRIPTION OF THE PREFERRED EMBODIMENTS

One exemplary positive traction differential unit 10 of the present invention is shown in FIG. 1 as incorporated into an exemplary vehicle such as a cart 12, which is powered by a gasoline engine 14. Engine 14 includes a crank shaft 16 which powers a first drive belt 18. Belt 18 is connected to a pulley 20 for rotating same as crank shaft 16 rotates. Pulley 20 also powers a second drive belt 22 entrained thereabout, which also is looped about pulley groove 24 (see FIG. 2) provided about the exterior 26 of a housing 28 of differential unit 10. Housing 28 is mounted for rotation with second drive belt 22 as pulley 20 turns.

Figure 2:
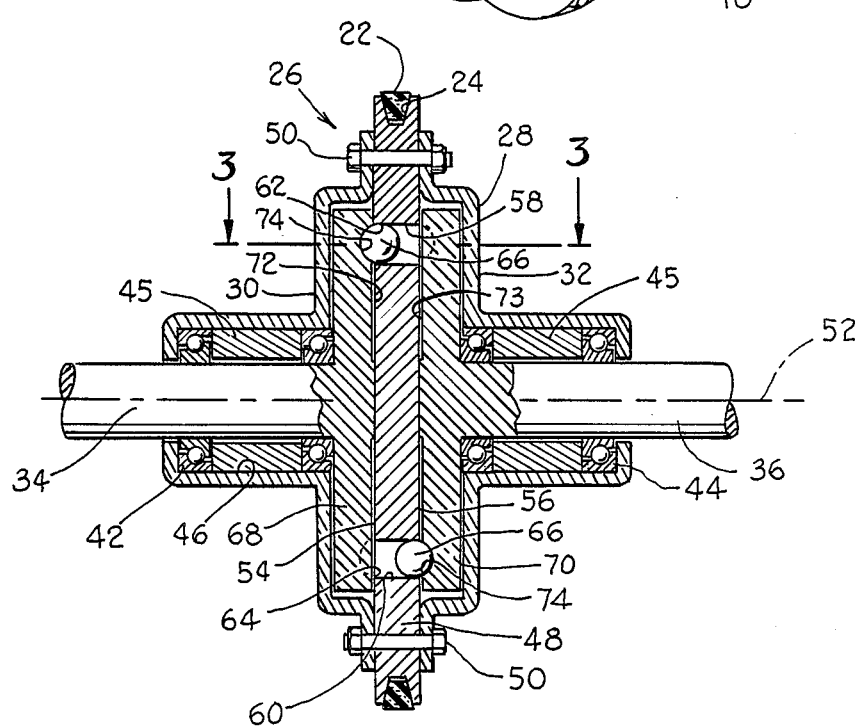
FIG. 2 is a side elevational view (partly sectioned) of a differential unit constructed in accordance with the present invention.

As shown in FIG. 2, extending outwardly from opposite sides 30 and 32 of housing 28 are rotatably mounted axle shafts 34 and 36. Wheels 38 and 40 are respectively supported on such axle shafts. Respective bearing assemblies 42 and 44 are provided in interior 46 of housing 28 for rotatably supporting axle shafts 34 and 36 therein. Spacers 45 may be used for situating the bearing assemblies within the housing. Optionally, interior 46 may be provided with liquid transmission lubricant, if desired. Likewise, bearing assemblies 42 and 44 may comprise conventional ball bearing assemblies, or any other suitable type of bearing structures.

A drive member 48 of preferably plate-like construction is centrally provided within the housing interior, and is fixedly attached to housing 28 by bolts 50, so that rotation of drive plate 48 about axis 52 causes corresponding rotation of housing 28 about such axis. Drive plate 48 is preferably generally circular and defines about its circumference thereof pulley groove 24 or an equivalent drive member such as a sprocket, gear, or the like. Drive plate 48 has disposed and first second sides 54 and 56 which are substantially parallel to one another.

A plurality of transversely extending slots 58 and 60 extend through drive plate 48. Such slots are angled oppositely to one another, when viewed as lying on a circle whose center is axis 52. The slots have openings 62 and 64, which are oppositely angled with respect to one another, and which may be spaced alternatingly with respect to one another (as discussed below with reference to FIGS. 7–10). Provided in each slot is a drive ball 66 which is of spherical shape, and preferably constructed of steel (but of course could be constructed of any other suitable metal or material).

Drive shafts 34 and 36 are each fixedly associated with a respective driven plate 68 and 70, also disposed within housing 28, for coincident rotation. Each driven plate is generally circular in shape and includes a driven face directed towards the center of housing 28. Driven face 72 of driven plate 68 opposes first side 54 of central or drive plate 48, while driven face 73 of driven plate 70 opposes second side 56 of drive plate 48.

Each driven face (72 and 73) includes a plurality of semi-spherical drive ball-receivers (i.e., depressions) 74 formed therein and disposed circumferentially. Drive ball receivers 74 receive and engage drive balls 66 as such balls project outwardly from slots 58 and 60 of drive plate 48 during rotation of drive plate 48 by second drive belt 22 (or an equivalent centralized source of rotational drive power). Such engagement between drive balls 66 and drive ball receivers 74 permits positive rotation of driven plates 68 and 70, which rotation in turn rotates axle shafts 34 and 36, and wheels 38 and 40 for propelling a vehicle such as an automobile, truck, tractor, all-terrain vehicle, cart 12, or the like. Furthermore, a pair of the differential units could be used respectively with the front and rear axles of a 4-wheel drive vehicle. Of course, differential unit 10 is not limited to use with vehicles, but may find other application in various machines defines where it is desired to transfer power from a rotational input to two rotating outputs.

The general operation of exemplary differential unit 10 is illustrated with reference to FIGS. 3A and 3B. In the FIG. 3A illustration, drive plate 48 is being driven to the right and is located between driven plates 68 and 70. Rotation of plate 48 causes the illustrated drive ball 66 within slot 58 to be forced outwardly from drive plate 48 (that is, outwardly from opening 64 in the second side 56 of drive plate 48), and into a drive ball receiver 74 in driven plate 70. After such engagement, the rotation of drive plate 48 in turn causes driven plate 70 to rotate in the same direction since the drive ball 66 is locked into the drive ball receiver 74 through a wedging action of drive ball 66 within drive ball receiver 74 by angled slot 58.

FIG. 3B illustrates the drive plate as being rotated in a direction opposite to that shown in FIG. 3A. Such reversal causes drive ball 66 to become dislodged from the position shown in FIG. 3A, and to be thrown outwardly from angled slot 58 in the opposite direction towards driven member 68. Drive ball 66 engages with a drive ball receiver 74 in driven member 68, whereby the rotational forces of drive plate 48 are transferred through drive ball 66 so as to cause driven member 68 to rotate with drive plate 48. The change in the direction of rotation of drive plate 48, as indicated between FIG. 3A and FIG. 3B, would occur when the desired direction of rotation of the axles is reversed. This may occur, for example, when switching a vehicle in which differential unit 10 is used from a forward motion to a reverse motion.

FIG. 4 illustrates an exploded view of an exemplary differential unit, such as unit 10 of FIGS. 1 and 2. Angled slots 58 and 60 preferably extend at 45° angles with respect to first and second sides 54 and 56 of drive plate 48. As discussed above, such slots are oppositely angled with respect to one another, and are alternatingly defined in drive plate 48, such as in the embodiments illustrated in FIGS. 7–10.

In addition to slots 58 and 60 being angled, they are also preferably curved about a center of curvature substantially coincident with the axis 52 of rotation of drive plate 48. Such a curved formation of slots 58 and 60 allows drive balls 66 to more readily pass back and forth between the opposing second sides of central drive plate 48.

If either driven member (68 or 70) is required to rotate at a faster rate than the other, such member is advanced relative drive plate 48. Thus, the drive ball formerly seated within a drive ball receiver of that driven member is forced out of such receiver and fully back into its corresponding angled slot. Such differentially faster rate can occur, for example, whenever a vehicle rounds a curve (requiring the "outside" wheel to rotate faster than the "inside" wheel). During such an occurrence, the "inside" wheel continues to be driven by the drive unit in accordance with this invention because a drive ball 66 continues to engage the drive plate with the corresponding driven member of such "inside" wheel. Eventually, whenever one driven member no longer is required to rotate at a differentially faster rate than the other, the previously unseated drive ball 66 will again engage with the driven member from which it was dislodged so that rotational power from central drive plate 48 will again be transferred to that driven member and its corresponding axle and wheel.

During normal operation, whenever a vehicle using differential unit 10 is travelling in a straight path, positive traction is achieved with both wheels such as 38 and 40, because the axle shafts to which they are connected are both positively driven by central drive plate 48 through the engagement of drive balls 66 in receivers 74 of respective driven plates 68 and 70. Thus, even if one of the wheels loses traction, it continues to receive positive driving rotation from the central drive plate.

However, whenever such vehicle rounds a curve, the wheel furthest from the center of rotation of the curve (i.e., the "outer" wheel) will have to rotate faster than the other wheel (i.e., the "inner" wheel), because the outer wheel will have to travel further than the inner wheel. While the inner wheel remains positively driven by drive plate 48, as discussed above, the outer wheel turns faster than the inner wheel, and due to such relative advancement a level portion 76 of the driven member situated as spacing between each receiver 74 unseats the drive ball and knocks it back into its associated drive member slot. Once such outer wheel no longer turns faster than the inner wheel (i.e., drive member 48), the ball again seats in a receiver 74 of the driven plate or member associated with such wheel.

Whenever a reverse rotation is applied to central drive plate 48 (for example, such as by reversing the rotational direction of drive belt 22 with a reversing clutch; or any equipment means), drive balls 66 disengage their presently engaged driven members, travel through their respective drive ball slots, and then engage the opposing driven member (as discussed above regarding FIGS. 3A and 3B). The function of the differential unit is then the same as before, with the only difference being that the direction o rotation is reversed.

At standstill in the FIG. 4 two-ball embodiment, because of the slot angles and gravity, both balls are against the near side driven disk. When rotated, the lead ball engages the near driven disk; while the other ball being near the lead end of the slot will not engage the near driven disk due to the spacing of the drive ball receivers. When the other ball passes bottom center, gravity pulls it to the far side of the slot for engaging the far side driven disk.

Figure 5:
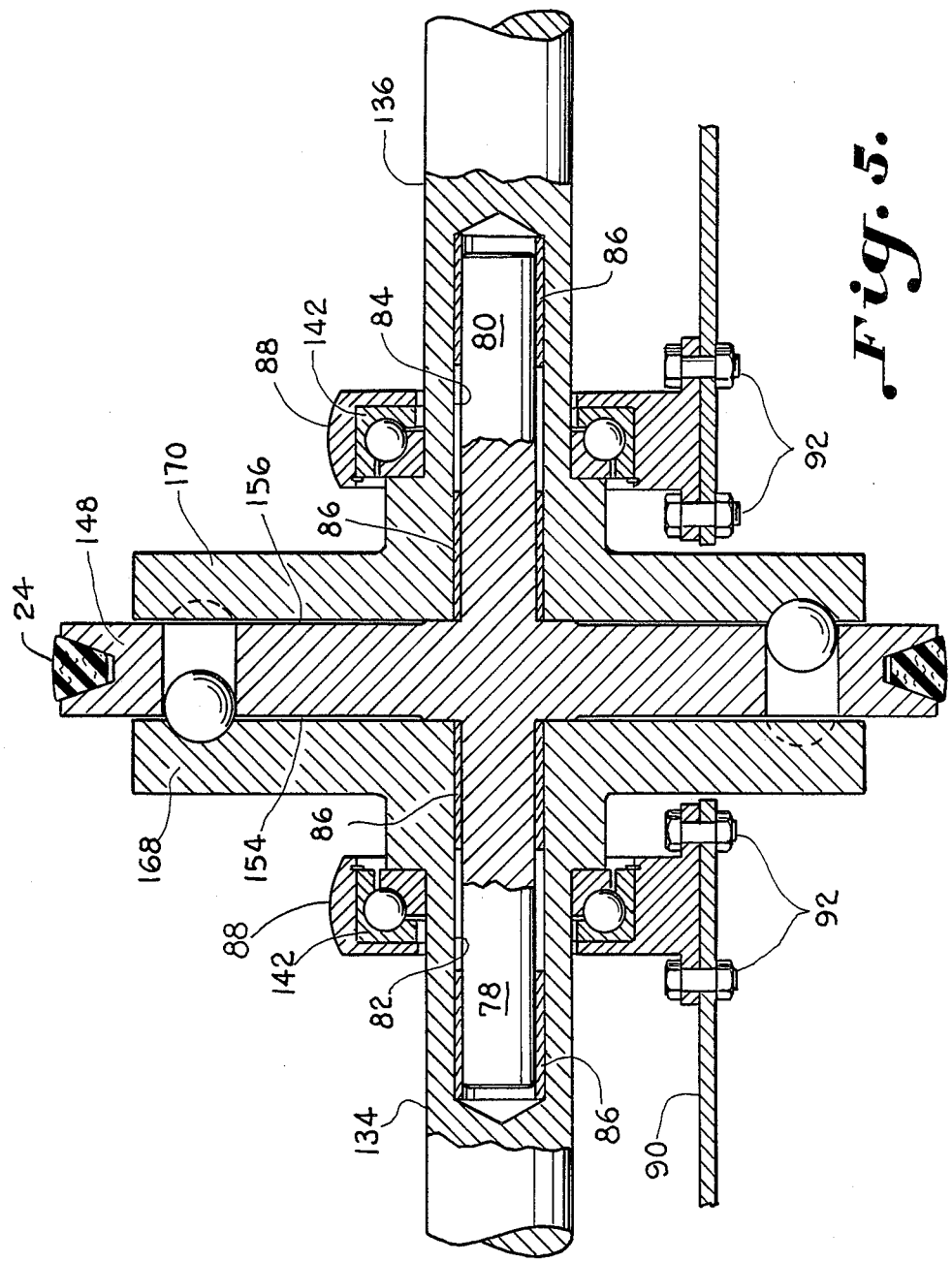
FIG. 5 is a side elevational view (partly sectioned) of another exemplary differential unit constructed in accordance with the present invention.
Figure 6:
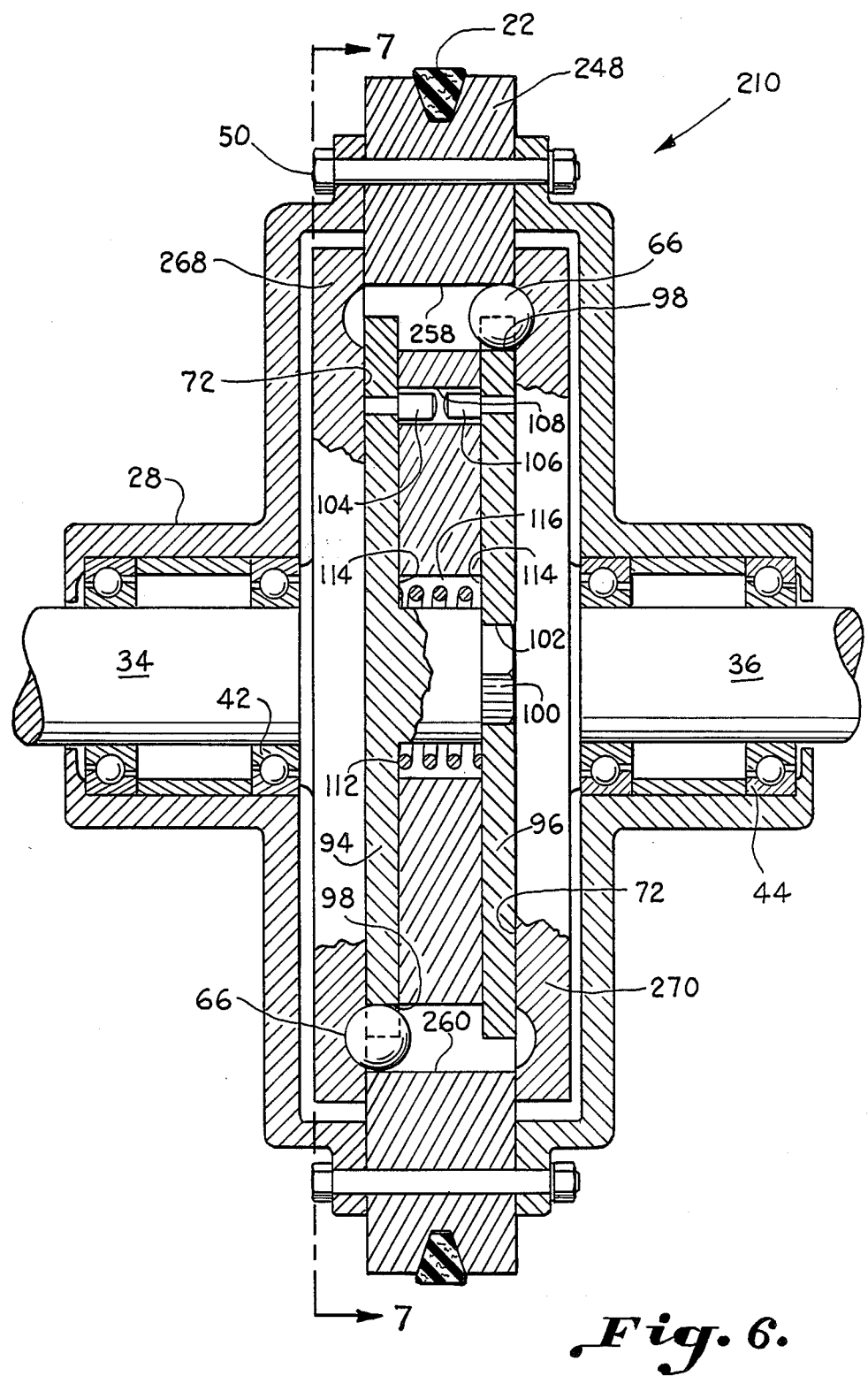
FIG. 6 is yet another side elevational view (partly sectioned) of one presently preferred exemplary embodiment of a differential unit constructed in accordance with the present invention.

An alternate embodiment of a differential unit 10 in conformance with the present invention is illustrated in FIG. 5. In this embodiment 110, central drive plate 148 is provided with shafts 78 and 80 extending substantially perpendicularly from the first side 154 and second side 156 thereof. Shafts 78 and 80 are received in passages or bores 82 and 84 defined respectively in axle shafts 134, 136. Sleeve bearings 86 are provided in both bores 82 and 84 for rotatably supporting shafts 78 and 80 therein. Bearing assemblies 142 are provided in bearing holders 88 for supporting shafts 134 and 136 for rotation. Bearing holders 88 are attached to a mounting surface 90 by bolts 92. Although no particular housing is illustrated, provided differential unit 110, such housing as disclosed above, could be provided differential unit 110 one analogous to housing 28.

The operation of differential unit 110 is generally analogous to differential unit 10. One exception is that drive plate 148 is provided with shafts 78 and 80 in respective bores 82 and 84 of axle shafts 134 and 136, for maintaining alignment of drive plate 148 with respect to such axle shafts. Shafts 78 and 80 carried in their respective bores allow relative rotation of driven plates 168 and 170 with respect to drive plate 148, and allow driven plates 168 and 170 to be rotated in unison with drive plate 148 in an analogous manner to that discussed above regarding differential unit 10.

Another preferred exemplary embodiment of the present invention is illustrated in FIGS. 6–10. Such differential unit 210 is generally similar to differential unit 10, except for the inclusion of selector members or plates 94 and 96, and a requisite plurality of each of the oppositely angled slots 258 and 260. Selector plates 94, 96 are housed between drive plate 248 and driven plates 268 and 270, respectively. The selector plates are fixed to one another through a center opening 116 of drive plate 248, such as by means of a square headed boss 100 provided on selector plate 94 and matingly engaging with a corresponding square hole 102 defined in selector plate 96. The engagement of square headed boss 100 with square hole 102 substantially prevents relative movement between selector plates 94 and 96.

The selector plates are allowed to rotate slightly with respect to drive plate 248. Such relative rotation is limited by pins 104 and 106, which extend inwardly, respectively, from selector plates 94 and 96 into arcuate slot 108. Thus, the selector plates rotate relative to drive plate 248 only to the extent that pins 104 and 106 may move within finite arcuate slot 108.

A coil spring 112 may be provided within center opening 116 of drive plate 248 for pushing against opposing inner surfaces 114 of selector plates 94 and 96 to bias them outwardly against driven faces 72 of driven plates 268 and 270. Such outward force of the selector plates respectively against the driven plates causes frictional engagement therebetween, resulting in slight following movement of the selector plates with the driven plates whenever the driven plates move relative to drive plate 248. Of course, selector plates 94 and 96 may obviously move with driven plates 268 and 270 only to the limited extent to which pins 104 and 106 may move within arcuate slot 108.

Selector plates 94 and 96 both include a plurality of arcuate passages 98 circumferentially spaced thereabout at a constant radius from axis 52, as are slots 258 and 260 which receive drive balls 66 in drive plate 248. As illustrated in FIGS. 7–10, passages 98 may be angled for correspondence with the angles of angled slots 258 and 260. FIG. 8 shows an alternate embodiment of the invention in which the passages 98' are not angled to correspond with slots 258 and 260. The spacing of passages 98 is such that either slots 258 or oppositely angled slots 260, but not both, are fully exposed by such selector plate passages 98 on a given side of drive plate 248, whenever pins 104 and 106 are at an end of arcuate slot 108. Whenever slots 258 are fully exposed on a given side of drive plate 248, slots 260 must also be fully exposed on the opposite side of drive plate 248. In this manner, each slot 258 and 260 will have one end facing one driven plate fully exposed and the opposite end facing the other driven plate partially exposed. For example, in FIG. 8 slots 258 are fully exposed to driven plate 270 in that passages 98 in selector plate 96 are aligned with holes 258. The opposite end of slots 258 adjacent selector plate 94 are only partially exposed, which shields slots 258 from driven plate 268.

Rotation of drive plate 248 forces drive balls 66 to those ends of slots 258 and 260 which are fully exposed to driven plates 268 and 270. Although drive plate 248 houses a plurality of drive balls 66, only one drive ball at a given time will be seated in a drive ball receiver 74 of each driven plate. Of course, dependent on relative rotational speed conditions, only one driven plate might be engaged at a time. The remaining unseated drive balls are put in contact with one of the driven plates but are not seated in a receiver 74, as discussed above, due to the relative spacing of such receivers and the drive plate slots. The selector plates 94 and 96 insure that drive balls will only come into contact with the driven plate necessary for correct operation of the differential unit 210, and will thus not interfere with the opposite driven plate. For example, see the left-hand drive ball 66 depicted in FIG. 8. The rotational direction of drive plate 248 in FIG. 8 is represented by arrow 272 therein.

Different numbers of drive ball receivers may be practiced, and the same number thereof do not need to be used for each driven plate. For example, plate 268 may be provided with a total of 31 receivers 74 while plate 270 has 27 such receivers 74.

Figure 10:
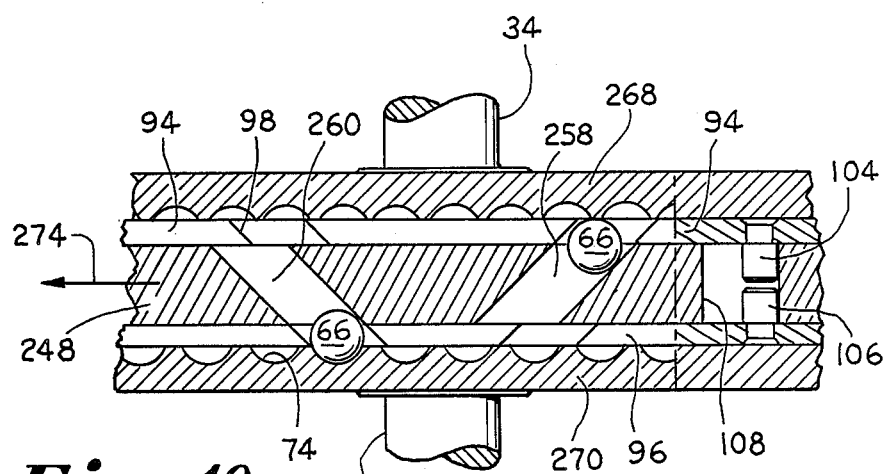
FIG. 10 is a sectional view taken along line 10—10 of FIG. 9, illustrating a center disk of such differential unit being driven in a given rotational direction thereof.

When the direction of rotation of drive plate 248 is reversed (eg., see FIG. 10 and directional arrow 274 therein), the position of selector plates 94 and 96 will shift to the extent allowed by movement of pins 104 and 106 in arcuate slot 108. As the pins 104 and 106 move to the opposite ends of arcuate slot 108 and the selector plates 94 and 96 are rotated accordingly, the respective ends of slots 258 and 260 which are fully exposed to driven plates 268, 270 are likewise reversed. As represented in FIG. 10, slots 258 are now fully exposed to driven plate 268 and are at least partially shielded from driven plate 270 (reverse to the conditions represented in FIG. 8). Due to such opposite rotation of drive plate 248 (arrow 274), the drive balls are forced to the opposite ends of the drive plate slots 258 and 260, and are again put in contact with the respective driven plates 268 and 270.

FIGS. 8 and 10 are similar to FIGS. 3A and 3B in that drive plate 248 is represented in opposite rotational directions, together with consequences of such reversal. As can be seen by comparing FIGS. 8 and 10, drive balls 66 shift from one driven plate to the other when the direction of drive plate 248 is reversed (assuming all other conditions being equal). Thus, an efficiently reversible differential unit is provided. It is to be noted that only the drive ball associated with driven member 270 in each of FIGS. 8 and 10 is illustrated as seated in a receiver 74, while the drive ball in the next passage is prevented from being seated because of the spacing of drive ball receivers 74 formed in driven member 268. This is as discussed above wherein there is only one other drive ball seated coincident with the one shown seated in driven plate 270, that drive ball being seated in driven plate 268 at another area of plate 268 (not shown).

Figure 7:
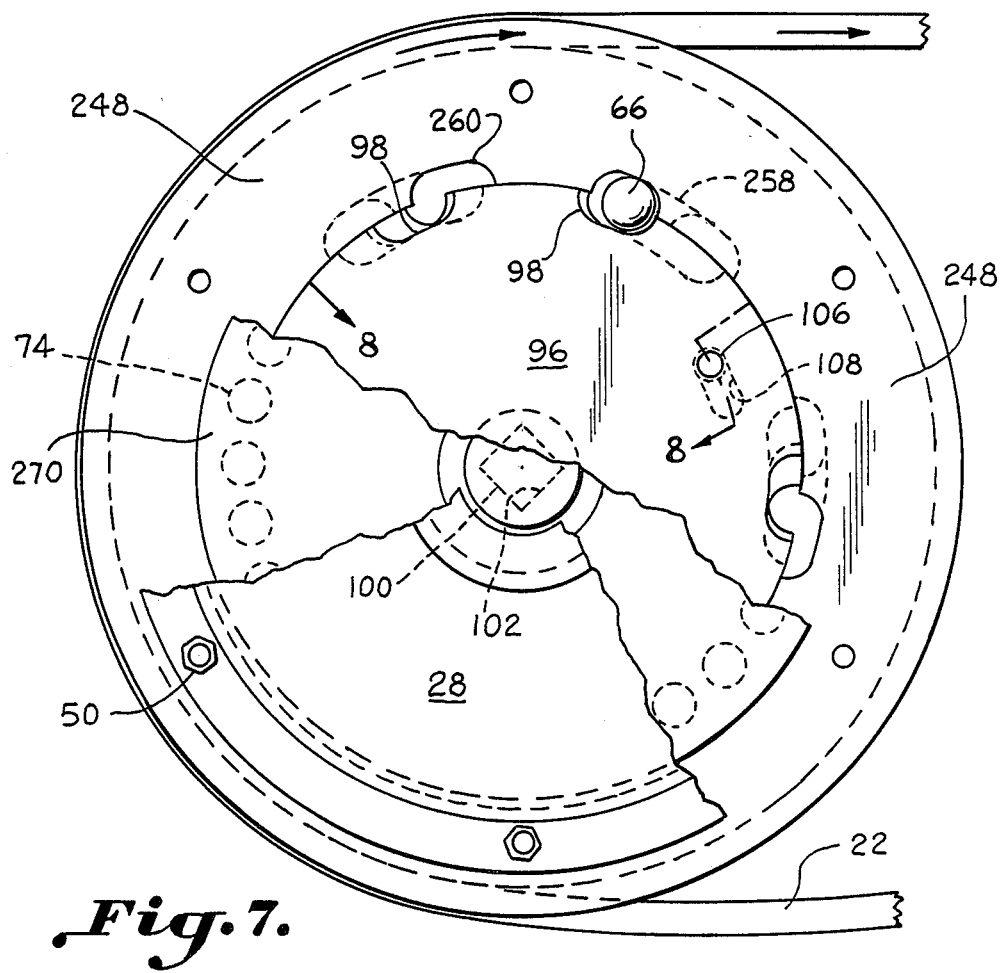
FIG. 7 is a sectional view of the exemplary differential unit of FIG. 6 taken along line 7—7 thereof.
Figure 8:
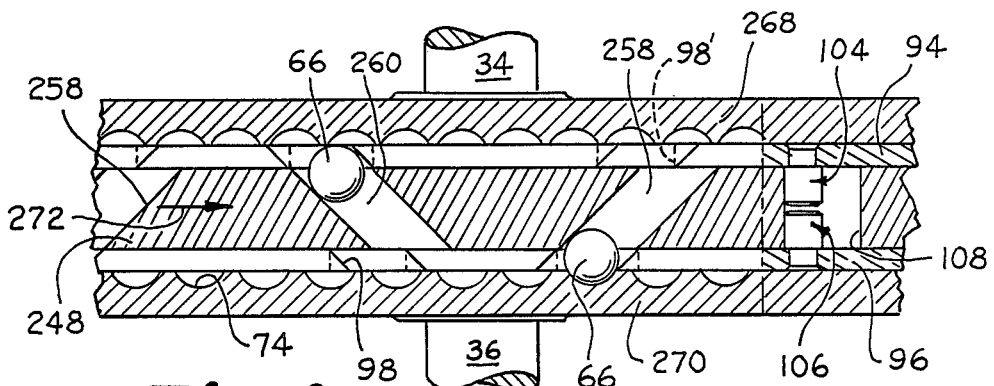
FIG. 8 is a plan view (partly cut away) of an exemplary differential unit as represented in FIGS. 6 and 7, illustrating a center disk of such differential unit being driven in one particular rotational direction.
Figure 9:
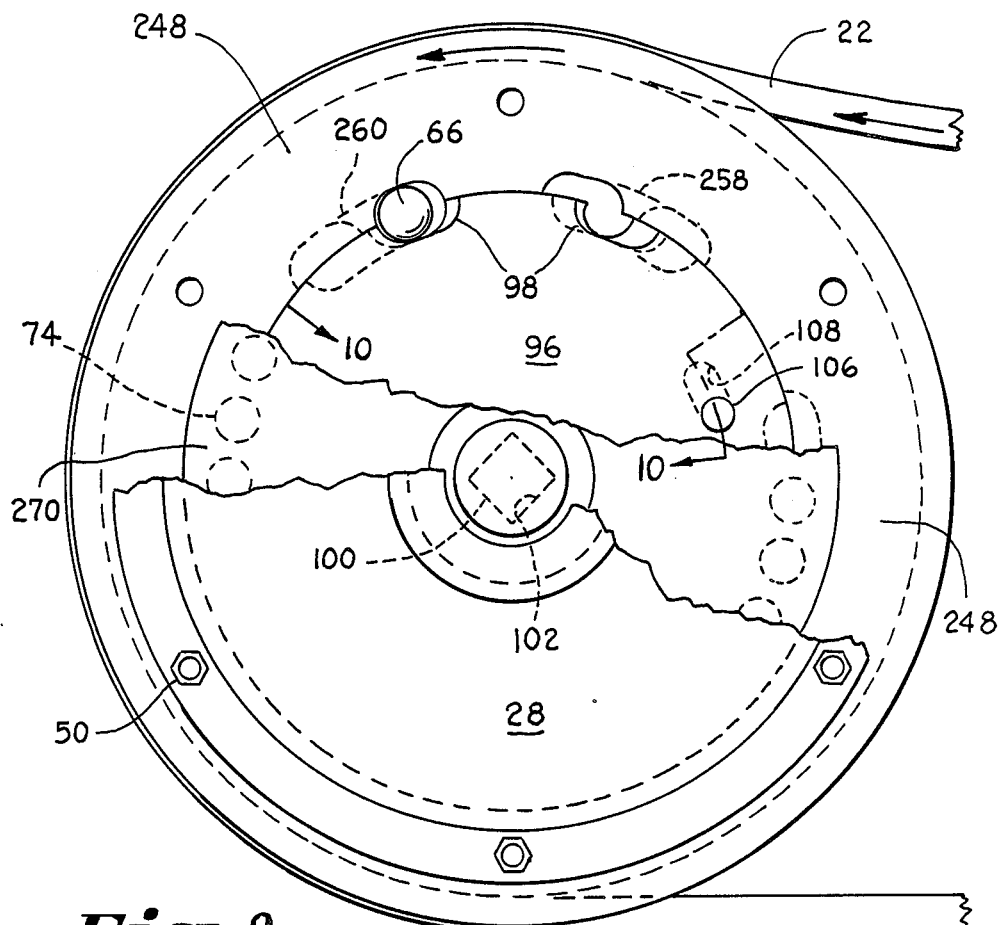
FIG. 9 is a side elevational view (partly cut away) of another differential unit constructed in accordance with the present invention.

FIG. 9 illustrates a view similar to that of FIG. 7, but with the differential drive 210 being driven in the opposite direction from that shown in FIG. 7. In FIG. 9, drive ball 66 in the upper left hole is fully exposed, wherein while drive ball 66 in the upper right slot is fully exposed when drive plate 248 is driven in the opposite direction as shown in FIG. 7.

Like earlier embodiments, unit 210 allows for rotation of wheels 38 and 40 at different seeds. For example, while a vehicle such as cart 12 is executing a turn and the outer wheel is rotating faster than the inner wheel, the driven plate associated with the inner wheel remains locked to the drive plate 248 by a drive ball 66. The driven plate associated with the outer wheel, however, rotates faster than the drive plate 248, thereby dislodging the one drive ball 66 seated within a drive ball receiver 74 of the faster-moving, outer driven plate. Thus, differential operation of unit 210 is analogous to that of unit 10.

The selector plates 94 and 96 of differential unit 210, as earlier described, provide an added feature not found in unit 10. During a turn, the drive balls 66 which had been adjacent to the driven plate which has begun to rotate faster than drive plate 248 tend to move loosely in the slots due to the relative rotation of the driven plate. The selector plate adjacent to the driven plate connected to the wheel which is still engaged (i.e., the inner wheel), shields the locked driven plate from the loose drive balls 66 in the slots within drive plate 248. This prevents any loose balls from becoming seated improperly in the locked driven plate, which would hinder efficient operation of unit 210.

The provision of additional slots 258 and 260 and drive balls 66 in differential unit 210, (compared with differential unit 10) allows for smoother, more efficient functioning. The increased number of drive balls, drive plate slots, and drive ball receivers result in the driven plates being engaged much more rapidly which provides smoother operation.

While specific presently preferred embodiments of the invention have been described using specific terms, such description is for present illustrative purposes only, and it is to be understood that changes and variations to such embodiment, including but not limited to the substitution of equivalent features or parts, and the reversal of various features thereof, may be practiced by those of ordinary skill in the art without departing from the spirit or scope of the invention.

For example, instead of semi-spherical drive ball receivers in the faces of driven plates, slightly elongated receivers 741 (e.g., see FIG. 3-A) may be provided. Such elongated members would better adapt the present invention for high speed operation, since they would in effect allow increased time for drive ball engagement. Thus, semispherical receivers would be adequate for relatively slower speed applications. In forming various embodiments, it is generally preferred that the diameter of the drive balls remain approximately the same as the thickness of the central drive plate.

Furthermore, it should be understood that the present invention is suitable for use with a four wheel drive, all-terrain vehicle. Here, both the front and rear axles are driven and would be fitted with an embodiment of the present invention providing improved differential traction for all four wheels. Alternatively, a differential of this invention may be used inbetween front and rear axles in conjunction with a transfer case.

In considering the present disclosure, it is intended that those of ordinary skill in the art regard illustrated cross-hatching in the drawings with its conventional meaning of sectioned surfaces, and likewise interpret other illustrated features as shown in partial section and/or cut away, regardless of whether the detailed description thereof discusses such matter. Likewise, it is intended that those of ordinary skill in the art understand that the drive plate slot feature of being angled is generally present throughout the figures though only fully represented in FIGS. 3A, 3B, 4, and 7–10, with the present invention being further set forth in the appended claims.

What is claimed is:

1. A differential drive, comprising:
   a rotatable drive plate adapted for receiving drive input, said plate including at least a pair of angled slots therein interconnecting opposing planar faces of said plate, said slots each respectively receiving a drive ball therein, and said slots defining acute angles with said plate planar faces in order to facilitate movement of said drive balls therein;
   first and second drive shafts rotatably supported on respective, opposite sides of said drive plate;
   first and second drive coupling members, supported on said first and second drive shafts, respectively, and each having a planar coupling face situated parallel to and in close proximity with planar faces of said drive plate; and
   at least one drive ball receiving recess defined in said coupling face of each of said drive coupling members;
   wherein rotation of said drive plate directs said drive balls outwardly in their angled slots into contact with said drive coupling members, with said drive balls engaging certain of said receiving recesses and thereby transmitting drive power to their corresponding drive coupling members and drive shafts, selection of which recesses depending on differential speed rotation of said drive shafts.

2. A differential drive as in claim 1, wherein:

said drive coupling members each have a plurality of said drive ball receiving recesses defined in their respective coupling faces; and said rotatable drive plate, and said first and second drive coupling members are all generally circular in nature and received within a protective housing.

3. A differential drive as in claim 2, wherein the number of drive ball receiving recesses defined in said coupling faces is not the same for said first drive coupling member as said second drive coupling member.

4. A differential drive as in claim 1, wherein said drive ball receiving recesses are semispherical in shape.

5. A differential drive as in claim 1, wherein said drive ball receiving recesses are elongated in shape.

6. A differential drive as in claim 1, further comprising a pair of selector plates respectively positioned between said drive plate and the respective drive coupling members, said selector plates having passages therethrough for selectively permitting a single drive ball at a time to engage between said drive plate and a respective drive coupling member.

7. A differential drive as in claim 1, wherein:
said drive shafts generally include central bores; and
said drive plate includes a pair of respective shaft members extending from either side thereof, and rotatably received within said drive shaft bores for stabilizing rotational relationships of such members.

8. A differential drive for differentially translating power from a rotational input to two rotational outputs, said drive comprising:
central drive member means for receiving rotational power, said central drive means including a drive plate having a first side and a second side disposed opposite from said first side, with a plurality of transverse angled slots extending therethrough between said first and second sides of said drive plate, said transverse angled slots including a first slot of a first acute angle with respect to said first side of said drive member and a second slot of a second, oppositely-directed acute angle with respect to said first side drive plate;
a plurality of drive balls carried in said first and second angled slots of said drive plate, said drive balls being outwardly projected in said angled slots upon rotation of said plate, such outward projection being facilitated by said acute angles of said slots;
a first driven member disposed adjacent said first side of said drive plate and mounted for rotation; and
a second driven member disposed adjacent said second side of said drive plate and mounted for rotation;
wherein each of said first and second driven members define a plurality of drive ball receivers for receiving said drive balls as said drive balls are projected outwardly, whereby upon rotation of said drive plate said drive balls are thrown outwardly in said first and second slots for engaging drive ball receivers of said first and second driven members, respectively, for causing rotational drive force from said central drive members means to be transferred differentially to said first and second driven members.

9. A differential drive as in claim 8, further comprising a rotatable housing having an interior portion and generally circular exterior portion for receiving rotational drive power; wherein said drive plate is fixedly attached in said housing interior for rotation therewith; and said first and second driven members are rotatably supported within said housing with bearing means.

10. A differential drive as in claim 9, wherein said exterior portion of said rotatable housing is adapted for receiving rotational drive force from a pulley with a drive belt entrained thereabout.

11. A differential drive as in claim 8, wherein said drive plate is substantially disc shaped, and wherein said first side and said second sides of said drive plate are generally flat and extend substantially parallel to one another.

12. A differential dive as in claim 8, wherein said first and second slots include a plurality of such slots respectively oppositely-directed at acute angles with respect to said first side of said drive plate.

13. A differential drive as in claim 8, wherein said first slot is angled with respect to said first side of said drive plate at approximately the same angle at which said second slot is angled with respect to said second side of said drive plate.

14. A differential drive as in claim 8, wherein:
said first and second driven members each include a substantially disc shaped driving flange having a first face and a second face; with said first face of said first driven member being adjacent said first side of said drive plate, and with said first face of said second driven member being adjacent said second side of said drive plate; and
wherein said drive further includes a drive shaft extending substantially perpendicularly from said second face of each of said first and second driven members; and
bearing means for rotatably supporting said drive shaft of each of said first and second driven members therein.

15. A differential drive as in claim 8, further comprising:
a first shaft extending outwardly from said first side of said drive plate and a second shaft extending outwardly from said second side thereof; and
a passage defined in said first driven member for receiving said first shaft of said drive member and another passage defined in said second driven member for receiving said second shaft of said driven member.

16. A differential drive apparatus for receiving a rotational input and for providing two rotational outputs, said differential drive apparatus comprising:
a rotatable drive member having a first side and an oppositely disposed second side, and a plurality of transverse angled slots extending therethrough between said first and second sides, said transverse angled slots including a first slot of a first angle with respect to said first side of said drive member and a second slot of a second angle with respect to said first side of said drive member;
drive means associated with said drive member for receiving rotational input, and thereupon rotating said drive member;
a plurality of drive balls movably carried in said transverse angled slots, said drive balls during rotation of said drive member being outwardly projectable from said first and second sides of said drive member while being carried in said first and second slots;

a first driven member disposed about said first side of said drive member, and a second driven member disposed about said second side of said drive member; and a first selector member disposed between said first driven member and said first side of said drive member, and a second selector member disposed between said second driven member and said second side of said drive member; said first and second selector members each defining at least one passage for receiving one of said drive balls projectable outwardly from said drive member; said first and second selector members including means for allowing only a predetermined number of drive balls to project outwardly at a time from each of said first and second sides of said drive member into engagement with said driven members;

wherein said first and second driven members each define a plurality of drive ball receivers for receiving said drive balls when said balls project outwardly from said first and second slots of said drive member and through said passages of said first and second selector members, whereby upon rotation of said drive member, said drive balls are thrown outwardly and said first and second slots such that said predetermined number of drive balls project outwardly therefrom through said first and second selector members for differentially engaging said first and second driven members respectively, where drive member slot and selector passage alignment is such that said drive balls are received by said drive ball receivers, thereby causing the rotational forces of said drive member to be differentially transferred to said first and second driven members.

17. A differential drive apparatus as in claim 16, further comprising:

a rotatable housing having an interior portion and an exterior portion, said drive member being fixedly attached in said interior portion of said housing for rotation therewith, and said first and second driven members being rotatably received disposed in said interior portion of said housing for rotation relative thereto; and wherein said drive means includes a pulley attached to said exterior portion of said housing for receiving the rotational input, with a drive belt entrained about said pulley.

18. A differential drive apparatus as in claim 16, wherein:

said first and second selector members are generally flat plates having a plurality of passages defined therein; and wherein only one of said passages of each of said first and second selector members is in alignment with a transverse angled slot at a time adjacent each of said first and second sides of said drive member, respectively, for allowing a drive ball to project outwardly therethrough.

19. A differential drive apparatus as in claim 16, wherein said first and second selector plates are substantially fixed with respect to one another so as to prevent relative rotational motion therebetween.

20. A differential drive unit as in claim 16, further comprising spring means disposed between said first and second selector members for biasing said first and second selector members apart from one another and against said first and second driven members, respectively.

* * * * *